United States Patent
Sauer et al.

(10) Patent No.: US 8,496,264 B2
(45) Date of Patent: Jul. 30, 2013

(54) AIRBAG COVER AND METHOD OF PRODUCING SAME

(75) Inventors: Rolf Sauer, Oberhausen-Rheinhausen (DE); Karsten Frank Bradfisch, Pirmasens (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 126 days.

(21) Appl. No.: 12/998,675

(22) PCT Filed: Nov. 24, 2009

(86) PCT No.: PCT/EP2009/008651
§ 371 (c)(1),
(2), (4) Date: Jun. 17, 2011

(87) PCT Pub. No.: WO2010/057679
PCT Pub. Date: May 27, 2010

(65) Prior Publication Data
US 2011/0241316 A1    Oct. 6, 2011

(30) Foreign Application Priority Data
Nov. 24, 2008   (DE) .......................... 10 2008 059 169

(51) Int. Cl.
*B60R 21/20*   (2011.01)
(52) U.S. Cl.
USPC ..................................... 280/728.3; 280/732
(58) Field of Classification Search
USPC ............. 280/728.3, 732; 219/121.68, 121.69, 219/121.7, 121.71; 264/400
See application file for complete search history.

(56) References Cited

U.S. PATENT DOCUMENTS

| | | | |
|---|---|---|---|
| 6,199,897 B1 | 3/2001 | Kreile | |
| 7,611,163 B2 * | 11/2009 | Schweizer et al. | 280/728.3 |
| 7,625,004 B2 | 12/2009 | Geltinger et al. | |
| 7,810,836 B2 | 10/2010 | Mueller et al. | |
| 7,989,052 B2 * | 8/2011 | Hehn et al. | 428/190 |
| 2008/0276445 A1 | 11/2008 | Aichner et al. | |

FOREIGN PATENT DOCUMENTS

| | | |
|---|---|---|
| DE | 199 44 371 A1 | 3/2001 |
| DE | 102 41 715 A1 | 3/2004 |
| DE | 10 2005 034 354 A1 | 2/2007 |
| DE | 10 2006 027 082 A1 | 12/2007 |
| DE | 10 2006 055 861 B3 | 2/2008 |
| DE | 10 2007 007 635 A1 | 8/2008 |
| EP | 0 832 788 A1 | 4/1998 |
| EP | 1 705 076 A1 | 9/2006 |
| EP | 1 980 455 A2 | 10/2008 |
| FR | 2 721 876 A1 | 1/1996 |
| WO | WO 2008/061600 A1 | 5/2008 |

* cited by examiner

*Primary Examiner* — Faye M. Fleming
(74) *Attorney, Agent, or Firm* — Marshall & Melhorn, LLC

(57) ABSTRACT

The invention relates to an airbag cover having a carrier and a visible-side surface made of leather or an imitation leather arranged on the carrier, wherein the surface has a uniform thickness and the carrier has a carrier thinning introduced along a tear line, and a reinforcing layer having a local weakening is arranged between the carrier and the surface, wherein the surface is attached directly to the reinforcing layer. The local weakening is formed by a minimal thickness of the reinforcing layer in the area of the tear line. The uniform thickness of the surface is less than or equal to 1 mm.

10 Claims, 2 Drawing Sheets

AIRBAG COVER AND METHOD OF PRODUCING SAME

BACKGROUND OF THE INVENTION

The subject of the application is an airbag arrangement having a carrier and a surface of leather or of imitation leather arranged at the visible side on the carrier, wherein the surface has a uniform thickness and the carrier has a thinned carrier portion introduced along a tear line. A reinforcement layer having a local weakening is arranged between the carrier and the surface, with the surface being directly connected to the reinforcement layer.

The use of high-quality materials such as leather or imitation leather continually results in problems in the discharge region of airbags. This is inter alia due to the fact that a leather surface of usual thickness not only does not tear, or only tears poorly, and does not allow an opening of the airbag flap disposed below. In the past, decorative seams were previously used in the prior art which trace the course of a tear line disposed beneath the surface. In this respect, the part regions of the surface are connected using a yarn, with the yarn having a lower tear resistance than the leather or imitation leather used. A controlled tearing open of the airbag flap hereby becomes possible.

More recently attempts have been made to avoid the use of decorative seams. FR 2721876 A1 thus shows, for example, an airbag cover apparatus which has a leather surface of uniform thickness and is arranged on a carrier. In this respect, a foam layer is arranged sectionally between the carrier and the surface and a spacer fabric is arranged in the region of a gap let into the carrier. The gap arranged in the carrier traverses the spacer fabric and ends at the lower side of the leather surface. It is thus possible due to the strength of the spacer fabric to enable a tearing open of the airbag flap along the groove. The disadvantage of such a design of the airbag arrangement is the clearly perceptible grooving in the region of the leather surface.

DE 10 2005 034 354 A1 shows an alternative approach. The airbag cover disclosed there has a carrier, a closed-pore foam layer, a film layer and a visible cover of leather arranged on the film layer. To allow a reliable tearing open along a tear line, the layer cover of leather is locally weakened in the region of the tear line, with the local weakening being formed continuously. It is possible due to the continuous transition to design the weakening such that it is not visible. A serious disadvantage of the subject matter disclosed in DE 10 2005 034 354 A1 is the process of the local weakening of the visible cover of leather. The introduction of the local weakening only allows small production tolerances so that a large quantity of rejects is often produced. This increases costs considerably.

BRIEF SUMMARY OF THE INVENTION

It is the object of the present invention to provide an airbag cover as well as a method of manufacturing such an airbag cover which do not have the aforesaid disadvantages.

The object is achieved by means of an airbag cover in accordance with claim 1 and by means of a manufacturing method in accordance with claim 6.

The airbag cover in accordance with the invention has a surface of leather or of imitation leather which has a uniform thickness of less than or equal to 1 mm. The manufacture of a surface—also of a large-area format—formed in this manner—is significantly simpler with respect to the introduction of a local weakening which is formed continuously and has to be produced within tight tolerance ranges.

So that the leather surface tears open reliably on the unfolding of an airbag arranged beneath the airbag cover, a thickness of less than 1 mm, preferably of less than 0.5 mm, is used. To manufacture a surface of leather or of imitation leather with such a thickness, the surface can be split or can be ground down to the desired thickness in a grinding process. When thinning the surface, it is not necessary to take care that the leather surface is only weakened in those regions which are located in the region of a later tear line. This simplifies the manufacture of the airbag arrangement to a considerable degree.

Since, however, very thinned leather surfaces or imitation leather surfaces do not have the desired haptic properties, a reinforcement layer is arranged beneath the surface of uniform thickness. A layer which has a greater softness than the carrier and thus reestablishes the desired haptic properties of the surface applied to the carrier is introduced between the surface and the carrier with the aid of the reinforcement layer. This in particular relates to the slight yielding of the leather surface on touch.

The reinforcement layer has a non-weakened region and a weakened region, with a local weakness which is located in the region of the tear line being introduced in the weakened region. I.e., in particular that the area of the local weakening or of the weakened region disposed beneath the surface viewed from the visible side is larger than the area of any material cut-out of the tear line extending into the reinforcement layer viewed from the visible side or the area of the thinned carrier portion introduced into the carrier, with a material cut-out or the thinned carrier portion having been introduced into the airbag cover as part of the tear line, for example in the form of a slit or perforation. In other words, the area of the local weakening or of the weakened region includes the area of the tear line and the local weakening or the weakened region of the reinforcement layer is different from the tear line or of a weakening forming the tear line.

The weakened region includes, in the cross-section toward the visible side, a preferably continuous change in the thickness of the reinforcement layer over a region larger than the region of the tear line.

The thickness of the reinforcement layer is furthermore larger in the non-weakened region with respect to the thickness in the weakened region. This in particular means that even without a tear line introduced as perforation, for example, or in the region of the local weakening outside individual perforation holes, for example, the non-vanishing minimal thickness of the local weakening is smaller than the thickness of the non-weakened region.

Generally, the local weakening of the weakened region is present independently of, for example, material cut-outs of a tear line. The relationship between the tear line and the local weakening exists only with respect to their spatial arrangement.

The thickness of the reinforcement layer is minimal, but not vanishing, in the region of the local weakening. This means that in the region of the local weakening, the thickness of the reinforcement layer admittedly tends toward zero, but does not vanish. Non-vanishing thicknesses of 0.05 mm can be used here, for example. The non-vanishing thickness of the reinforcement layer at the local weakening improves the surface feel in the region of the tear line.

In the non-weakened region, which is located outside the region of the tear line, the thickness of the reinforcement layer can amount to up to 2 mm, particularly preferably up to 1 mm or less. This thickness is sufficient to imitate the haptic properties of a leather surface which is thicker than 1 mm.

A thinned carrier portion is introduced into the carrier itself in the form of a perforation or of a similar measure known in the prior art. The perforation can, for example, be manufactured by means of a laser or by means of milling. The tear line is then defined by the course of the perforations in the plane of the airbag cover. The material weakenings introduced within the framework of the tear line are different from the local weakening of the reinforcement layer.

The airbag cover in accordance with the invention is therefore already advantageous since the introduction of a local weakening in a weakened region of the reinforcement layer is a lot simpler with a reinforcement layer than with a layer of leather or of imitation leather. The reinforcement layer can thus, for example, be manufactured in a molding tool or by means of a pressing tool. In the subsequent connecting of the reinforcement layer to the surface of uniform thickness, it is not necessary to take care how the surface is arranged on the reinforcement layer since the local weakening is not arranged in the region of the leather surface, but rather in the region of the reinforcement layer.

This reinforcement layer is formed, for example, by a woven fabric or knitted fabric or by a film layer. Imitation leather can, for example, be used as a fabric; a knitted polyester or cotton fabric can be used as a knitted fabric; and a film of polyolefins can be used as a plastic layer. The carrier of the airbag cover, which is preferably formed as an integral part of a dashboard, can comprise, for example, a plastic such as polypropylene or reinforced polypropylene.

The surface is directly connected to the reinforcement layer. The connection can be effected, for example, by the application of an adhesive onto a lower side of the surface remote from the visible side and/or of the oppositely disposed upper side of the reinforcement layer. The adhesive layer is in this respect preferably of uniform thickness and/or is applied continuously between a non-weakened region and the local weakening of the weakened region to ensure an unchanging connection between the reinforcement layer and the surface.

In a preferred embodiment, a further layer is arranged between the carrier and the reinforcement layer. This further layer can include a soft component such as a polyurethane foam. In this case, the further layer is preferably between 8 and 10 mm thick. However, a spacer fabric, for example of polyester, can also act as an intermediate layer. In this case, a thickness between 2 and 5 mm is sufficient. For the event that the further layer is a knitted fabric and the reinforcement layer is likewise a knitted fabric, the further layer and the reinforcement layer can be manufactured in one process step. The thicknesses change accordingly so that the thickness of the spacer fabric of the further layer and the thickness of the knitted fabric of the reinforcement layer are added to one another.

The length along which the reinforcement layer merges from the non-weakened region into the weakened region with the local weakening can amount to between 20 and 50 mm. It is ensured in this manner that the local weakness cannot be perceived from the side of the vehicle's passenger compartment. In a particularly preferred embodiment, the thickness of the reinforcement layer changes continuously, viewed along the surface, between the non-weakened region and the local weakening of the reinforcement layer.

The airbag arrangement in accordance with the invention is particularly preferably used as part of a dashboard. In this respect, the surface of the airbag arrangement is connected integrally, preferably in one piece, to the surface of the dashboard. In regions of the dashboard which have a foldback, the thickness of the leather surface of the dashboard can change abruptly, preferably increase, to take up higher tearing forces such as occur in regions of foldbacks. The reinforcement layer such as is arranged in the region of the airbag cover can, however, also be removed in regions outside the airbag arrangement (i.e. it can be dispensed with outside the weakened region, optionally with a part of the non-weakened region), with the thickness of the surface of the dashboard increasing abruptly, with the thickness adopting the sum of the thickness of the surface of the airbag arrangement and of the thickness of the reinforcement layer in the region of the local weakening.

BRIEF DESCRIPTION OF THE DRAWINGS

The invention will be explained in the following with reference to some embodiments. There are shown.

DETAILED DESCRIPTION OF THE INVENTION

Figure 1:
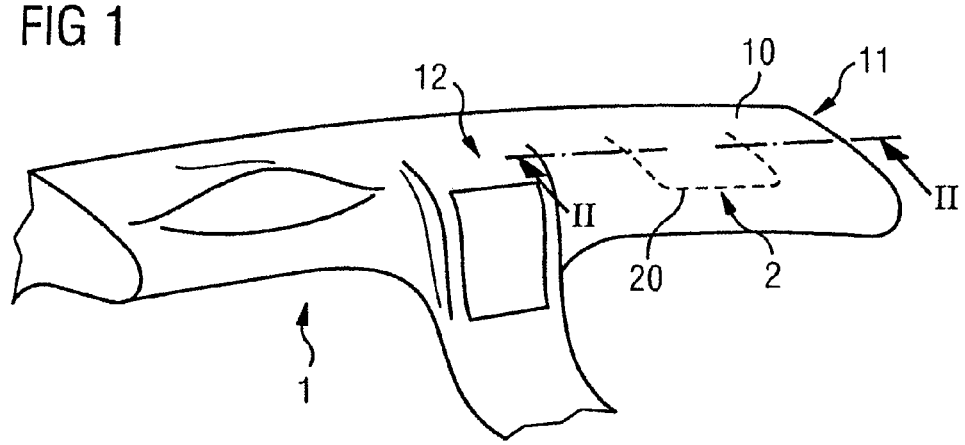
FIG. 1 a dashboard with an airbag arrangement.

A dashboard 1 is shown in FIG. 1 having an airbag cover 2 arranged on the passenger side. In this respect, the airbag cover 2 is only shown schematically along a tear line 20.

The dashboard 1 has a one-piece leather surface 10. Alternatively, the surface 10 can be composed of a plurality of large-area surface pieces, with the different pieces being connected to one another by seams or adhesive bonds. The dashboard 1 moreover has a margin 11 and a center console 12. The dashboard 1 has a non-visible carrier structure which can be formed, for example, by a self-supporting integral structure. The dashboard 1 can, however, also be composed of a plurality of part pieces. The preferred carrier material is polypropylene or fiber-glass reinforced polypropylene. An additional foam layer which is covered by the surface 10 can be arranged thereon.

Figure 2:
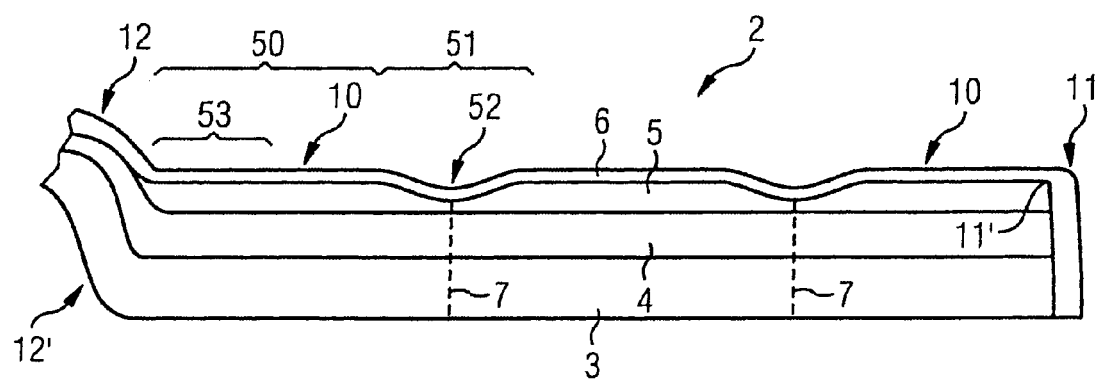
FIG. 2 a cross-section through the airbag arrangement of FIG. 1.

The cross-section II through the dashboard 1 is shown in FIG. 2, with the cross-section II cutting the airbag cover 2.

The airbag cover 2 has—visible only in cross-section—a carrier 3 which is made as part of the carrier of the dashboard. An optional further layer 4 of a polyurethane foam is arranged on the carrier 3. This further layer serves the improvement of the haptic properties of the airbag cover 2 or of the dashboard 1. A reinforcement layer 5 which comprises a polyolefin film is arranged on the further layer 4. The reinforcement layer 5 has a non-weakened region 50 which is adjoined by a weakened region 51. The weakened region 51 includes a local weakening 52 at which the thickness of the reinforcement layer 5 is reduced to its minimum. The reinforcement layer 5 extends to the left up to and into the vicinity of the center console 12. The part section 53, which forms a part region of the non-weakened region 50, is already to be understood as a part of the dashboard 1 and no longer as a part of the airbag cover 2. A surface 6 is arranged on the reinforcement layer 5 and in the present case is designed as a part region of the surface 10 of the dashboard 1. As can be seen from FIG. 2, the surface 6 has a uniform thickness in the region of the airbag cover 2. This thickness amounts to less than 0.5 mm, preferably 0.2 mm to 0.3 mm.

The surface 6 extends to the right into the surface 10 passing beyond the margin 11 of the dashboard 1. A foldback 11' is located at the margin 11 and the surface 6 or the surface 10 is applied along it. Since higher tensile forces occur in this region of the foldback, in particular on the lamination of the surface 6 or of the surface 10, the thickness of the surface can increase abruptly in this part region with respect to the region of the uniform thickness of the surface 6 of the airbag cover 2. Since a passenger does not perceive such a reinforcement of the surface 6 or surface 10 due to the foldback 11', the visual effect of the dashboard 1 is not impaired. The surface 6 at the other end of FIG. 2 extends into the surface 10 merging into the region of the center console 12. Since higher tensile forces can also increasingly act on the surface here, the thickness also increases abruptly here without an observer noticing it. The increase in the thickness of the surface is here likewise carried out in the region of the foldback 12'.

The reinforcement layer 5 shown in FIG. 2 has a thickness of 1 mm in the non-weakened region 50. The thickness of the reinforcement layer 5 at the local weakening 52, which is arranged directly above the thinned carrier portion formed as a perforation 7, amounts to 0.05 mm. The weakened region 51 migrating from the local weakening 52 to the non-weakened region 50 extends over a length of 30 mm. It is hereby possible that the local weakening 52 remains invisible for an observer despite the reduced thickness. The length from the local weakening 52 up to the margin of the weakened region 51 to the right likewise amounts to 30 mm. The transition from the non-weakened region 50 to the weakened region 51 extends constantly up to the local weakening 52. This improves the look of the airbag cover 2 or of the dashboard 1.

It can clearly be recognized that the perforation 7 adopts a smaller surface, viewed from the visible side of the airbag cover 2 and hidden by the surface 10, than the area of the weakened region 51. The perforation 7 is arranged in the region of the local weakening 52, i.e. in the region of minimal, non-vanishing thickness of the reinforcement layer 5. The section of the airbag arrangement shown indicates the perforation holes. It can, however, be recognized equally clearly that the non-vanishing thickness of the reinforcement layer is lower in the region of the local weakness 52, independently of the perforation 7 or of similar material cut-outs serving as a tear line, than in the remaining region of the weakened region 51 and also of the non-weakened region 50.

The second weakened region shown in FIG. 2 above the second perforation 7 is designed analog to the weakened region 51.

To introduce the weakened region 51 into the reinforcement layer 5, a reinforcement layer 5 of uniform thickness is first manufactured such as is present in the non-weakened region 50. Subsequently, the weakened region 51 with the local weakening 52 is introduced, either by pressing or hot melting or similar processes. For example, on the use of artificial leather as a reinforcement layer, the weakened region can thus be introduced by means of a splitting process.

The tear line 20 of the airbag cover 2 is shown by the dashed line in FIG. 1. In this respect, the tear line is defined by the perforations 7 as is clearly recognizable in the cross-section of FIG. 2. The perforations shown here are introduced by means of a laser perforation process and pass through both the carrier 3 and the further layer 4. Optionally, the perforation can also pass through the reinforcement layer 5 in the region of the local weakness 52. An improved tearing behavior of the airbag cover 2 is hereby reached.

Figure 3:
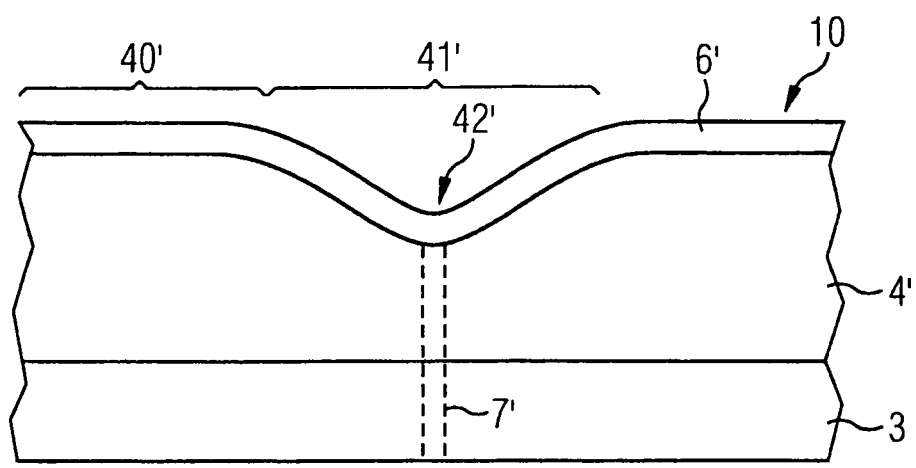
FIG. 3 an alternative embodiment of an airbag cover.

In FIG. 3, an alternative design of an airbag cover 2' is shown. In this respect, only a part region is shown which includes a local weakening.

The airbag cover 2' likewise has a carrier 3. A knitted fabric 4' is applied to it which simultaneously serves as a spacer fabric and as a reinforcement layer. The knitted fabric 4' is made from polyester and can be manufactured in a molding tool. In this respect, the weakened region 41' having the local weakness 42' can already be introduced by means of the defined shape of a molding tool in the manufacture of the knitted fabric 4'. The manufacturing process for the total airbag arrangement 2' is hereby dramatically simplified. The thickness of the knitted fabric 4' in the non-weakened region 40' amounts to 4 mm. The thickness amounts to 3 mm in the region of the local weakening 42'. In this respect, a perforation 7' which passes through the carrier 3 and the knitted fabric 4' is introduced in the region of the local weakening 42'. The surface 6' arranged on the knitted fabric 4' comprises imitation leather. The thickness of the surface 6' amounts to 0.3 mm.

This thickness was produced over a large area by means of a splitting process. The length between the non-weakened region 40' and the local weakening 42' amounts to 40 mm.

If the knitted fabric 4' is substituted in FIG. 3 by a polyolefin layer of smaller thickness, this polyolefin layer can be manufactured directly on the carrier in an injection molding process. In this respect, the molding tool has the desired shape with a non-weakened region and a weakened region with local weakening. Subsequently, only the surface 6' has to be laminated on. The thickness of the polyolefin layer in this respect amounts to between 1 mm in the non-weakened region and 0.05 mm in the weakened region.

The invention claimed is:

1. An airbag cover having a carrier and a surface of leather or of imitation leather arranged at the visible side on the carrier, wherein the surface has a uniform thickness and the carrier has a thinned carrier portion introduced along a tear line and a reinforcement layer having a local weakness is arranged between the carrier and the surface, wherein the surface is directly connected to the reinforcement layer, wherein
   the reinforcement layer has a non-weakened region and a weakened region which includes the local weakening and the thickness of the reinforcement layer reduces continuously from the non-weakened toward the local weakening and the local weakening is formed in the region of the tear line by a minimal, non-vanishing thickness of the reinforcement layer and the uniform thickness of the surface amounts to less than or equal to 1 mm.

2. An airbag cover in accordance with claim 1, wherein the uniform thickness of the surface amounts to less than 0.5 mm.

3. An airbag cover in accordance with claim 1, wherein the reinforcement layer is made without interruption.

4. An airbag cover in accordance with claim 2, wherein the reinforcement layer is made without interruption.

5. An airbag cover in accordance with claim 2, wherein the thickness of the reinforcement layer reduces constantly from the non-weakened region toward the local weakening.

6. An airbag cover in accordance with claim 1, connected to a dashboard.

7. A dashboard having a carrier, a surface of leather or imitation leather and an airbag arrangement in accordance with claim 1, wherein the surface of the airbag arrangement is integrally connected to the surface of the dashboard, and the surface of the dashboard has a foldback and the thickness of the surface of the dashboard changes abruptly in the region of the foldback.

8. The dashboard according to claim 7, wherein surface of the airbag arrangement and the surface of the dashboard are made in one piece.

9. The dashboard according to claim 8, wherein the thickness of the surface of the dashboard increases in the region of the foldback.

10. A method of manufacturing an airbag arrangement in accordance with claim 1, wherein the method includes the following steps:

a) thinning of the entire surface to a uniform thickness below 1 mm;
b) applying the reinforcement layer onto the carrier, wherein the reinforcement layer has a local weakening in the region of a tear line which has a minimal, non-vanishing thickness in the region of the tear line; and
c) connecting the surface of uniform thickness to the reinforcement layer.

* * * * *

UNITED STATES PATENT AND TRADEMARK OFFICE
CERTIFICATE OF CORRECTION

PATENT NO.        : 8,496,264 B2
APPLICATION NO. : 12/998675
DATED             : July 30, 2013
INVENTOR(S)       : Sauer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 150 days.

Signed and Sealed this

Fifteenth Day of September, 2015

Michelle K. Lee
*Director of the United States Patent and Trademark Office*